United States Patent
Wang et al.

(10) Patent No.: US 8,969,450 B2
(45) Date of Patent: Mar. 3, 2015

(54) MODIFIED RUBBER COMPOSITIONS AND METHODS OF PREPARATION

(75) Inventors: Xiaorong Wang, Hudson, OH (US); Victor J. Foltz, Akron, OH (US); Edward D. Kelley, Tallmadge, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/513,213

(22) PCT Filed: Dec. 1, 2010

(86) PCT No.: PCT/US2010/058520
§ 371 (c)(1),
(2), (4) Date: Jun. 1, 2012

(87) PCT Pub. No.: WO2011/068846
PCT Pub. Date: Jun. 9, 2011

(65) Prior Publication Data
US 2012/0302665 A1 Nov. 29, 2012

Related U.S. Application Data

(60) Provisional application No. 61/265,544, filed on Dec. 1, 2009.

(51) Int. Cl.
| | |
|---|---|
| *B60C 1/00* | (2006.01) |
| *C08K 3/36* | (2006.01) |
| *C08K 5/20* | (2006.01) |
| *C08K 5/05* | (2006.01) |
| *C08K 5/101* | (2006.01) |
| *C08K 5/548* | (2006.01) |
| *C08L 21/00* | (2006.01) |
| *C08L 89/00* | (2006.01) |

(52) U.S. Cl.
CPC ... *C08K 3/36* (2013.01); *C08K 5/20* (2013.01); *B60C 1/0016* (2013.01); *C08K 5/05* (2013.01); *C08K 5/101* (2013.01); *C08K 5/548* (2013.01); *C08L 21/00* (2013.01); *C08L 89/00* (2013.01)
USPC .............. 524/217; 524/17; 524/285; 524/325

(58) Field of Classification Search
CPC ............ C08K 5/05; C08K 5/101; C08K 5/20; C08L 9/06; B60C 1/0016
USPC .................... 524/17, 217, 285, 325
See application file for complete search history.

(56) References Cited

U.S. PATENT DOCUMENTS

| | | | |
|---|---|---|---|
| 4,867,968 A * | 9/1989 | Allen | 514/39 |
| 5,283,283 A | 2/1994 | Ogata | |
| 6,846,675 B2 | 1/2005 | Conrad et al. | |
| 6,850,790 B2 | 2/2005 | Berner et al. | |
| 6,887,836 B2 | 5/2005 | Majeti et al. | |
| 6,902,905 B2 | 6/2005 | Burson et al. | |
| 6,916,654 B1 | 7/2005 | Sims et al. | |
| 6,923,986 B2 | 8/2005 | Pathak et al. | |
| 6,974,697 B2 | 12/2005 | Comer et al. | |
| 6,999,810 B2 | 2/2006 | Berner et al. | |
| 7,008,633 B2 | 3/2006 | Yang et al. | |
| 7,008,635 B1 | 3/2006 | Coury et al. | |
| 7,052,729 B2 | 5/2006 | Antheunisse et al. | |
| 7,070,827 B2 | 7/2006 | Cavallini et al. | |
| 7,084,117 B2 | 8/2006 | Culler et al. | |
| 7,087,244 B2 | 8/2006 | Jeong et al. | |
| 7,094,751 B2 | 8/2006 | Bringe | |
| 7,174,199 B2 | 2/2007 | Berner et al. | |
| 7,179,867 B2 | 2/2007 | Chang et al. | |
| 7,183,068 B2 | 2/2007 | Burson et al. | |
| 7,196,178 B2 | 3/2007 | Jung et al. | |
| 7,202,228 B2 | 4/2007 | Shimizu et al. | |
| 7,250,177 B2 | 7/2007 | Pathak et al. | |
| 7,256,180 B2 | 8/2007 | Kabanov et al. | |
| 7,270,842 B1 | 9/2007 | Lanier et al. | |
| 7,311,861 B2 | 12/2007 | Lanphere et al. | |
| 7,320,325 B2 | 1/2008 | Duchon et al. | |
| 7,332,153 B2 | 2/2008 | Bhatia et al. | |
| 7,425,340 B2 | 9/2008 | Grenier et al. | |
| 7,462,366 B2 | 12/2008 | Lanphere et al. | |

FOREIGN PATENT DOCUMENTS

| | | |
|---|---|---|
| BE | 699486 A | 11/1967 |
| EP | 1234852 A1 | 8/2002 |
| EP | 1568713 A1 | 8/2005 |
| GB | 233430 A | 5/1925 |
| GB | 459972 A | 1/1937 |
| GB | 1365215 A | 8/1974 |
| JP | 2009029991 A * | 2/2009 |

OTHER PUBLICATIONS

Machine translation of EP 1 234 852 A1, Aug. 28, 2002.*

* cited by examiner

*Primary Examiner* — Vickey Nerangis
(74) *Attorney, Agent, or Firm* — Meredith E. Hooker; Nathan T. Lewis

(57) ABSTRACT

Modified rubber compositions containing an elastomer component and a modifier comprising a steroid and/or a peptide and methods of their production. Such modified rubber compositions can have improved properties and can be useful in making various articles of manufacture, such as, for example, in the manufacture of tires.

26 Claims, No Drawings

MODIFIED RUBBER COMPOSITIONS AND METHODS OF PREPARATION

CROSS-REFERENCE TO RELATED APPLICATIONS

This application is a national stage application of PCT/US2010/058520 filed on Dec. 1, 2010, which in turn claims priority to provisional application 61/265,544, filed on Dec. 1, 2009.

BACKGROUND

1. Field

One or more embodiments of the invention relate to modified rubber compositions comprising an elastomer component and a modifier comprising a steroid, a peptide, or mixtures thereof.

2. Description of Related Art

Since the advent of vulcanized rubber, the composition and manufacture of tires have undergone many advances. Because tires are often subjected to rough road conditions that cause repetitive, localized high-pressure impact on a tire, fatigue fractures can occur leading to crack formation and growth in the tire. Accordingly, advances in tires have included such innovations as including reinforcing materials in tires, such as carbon black, silicas, silica/silanes, and/or short fibers. The addition of silica in tires has been found to deflect and suppress cut prolongation, while silanes have been employed to bind the silica to unsaturated elastomers. Fibers that have been employed as tire additives include nylon and aramid fibers. However, despite such advances in tire additives, there remains a compromise in rubber formulation between improving traction and improving wear resistance. This is because generally an increase in traction, which is typically accomplished by employing a softer rubber, comes at the expense of wear resistance, which is generally improved by employing a harder rubber. Accordingly, improved additives that address both of these concerns could be desirable.

SUMMARY

One embodiment of the invention concerns a tire comprising a rubber composition containing an elastomer component and a modifier selected from the group consisting of a steroid, a peptide, and mixtures thereof, where the tire comprises the rubber composition in an amount of at least 0.1 weight percent based on the entire weight of the tire.

Another embodiment of the invention concerns a method of making a tire. The method of this embodiment comprises: (a) preparing a rubber composition comprising an elastomer component and a modifier selected from the group consisting of a steroid, a peptide, and mixtures thereof; (b) introducing at least a portion of the rubber composition into a tire mold; and (c) subjecting the rubber composition in the tire mold to curing conditions to thereby form the tire.

Yet another embodiment of the invention concerns a method of making a rubber composition. The method of this embodiment comprises: (a) subjecting an elastomer component and a silica filler to an initial mixing stage to thereby form an initial mixture; (b) combining and mixing a steroid and/or a peptide with the initial mixture following the initial mixing stage to thereby form an intermediate mixture; and (c) combining and mixing one or more curing additives with the intermediate mixture to thereby form the rubber composition.

DETAILED DESCRIPTION

In accordance with one or more embodiments of the invention, there is provided a rubber composition comprising an elastomer component and a modifier selected from the group consisting of a steroid, a peptide, and mixtures thereof. Such rubber compositions can be prepared employing a multi-stage mixing process and can be employed in various articles of manufacture, such as in a tire.

In one or more embodiments, the rubber compositions can be modified by the addition of a steroid. Any steroid known or hereafter discovered can be employed. For example, any steroid having a substituted or unsubstituted, saturated or unsaturated sterane core, as shown in formula (I) below, can be employed:

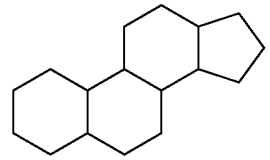

Formula (I)

Such steroids can be one or more selected from the group consisting of cholestanes (e.g., cholesterol), cholanes (e.g., cholic acid and cholates), pregnanes (e.g., progesterone), androstanes (e.g., testosterone), estranes (e.g., estradiol), derivatives thereof, and mixtures of two or more thereof.

In one or more embodiments, the steroid can be selected from the group consisting of cholestanes, cholestenes, derivatives thereof, or mixtures or two or more thereof. In such embodiments, the steroid can comprise cholesterol (a.k.a., 3β-hyroxy-5-cholestene or (3S,8S,9S,10R,13R,14S,17R)-10,13-dimethyl-17-[(2R)-6-methylheptan-2-yl]-2,3,4,7,8,9,11,12,14,15,16,17-dodecahydro-1H-cyclopenta[a]phenanthren-3-ol), a derivative of cholesterol, or mixtures or two or more thereof. Examples of cholesterol derivatives suitable for use in various embodiments include, but are not limited to, ester derivatives of cholesterol, halogenated derivatives, and mixtures or two or more thereof. In one or more embodiments, the steroid employed as a modifier in preparing the rubber composition comprises cholesterol.

Ester derivatives of cholesterol suitable for use as a modifier in preparing the rubber composition in various embodiments can have the following formula:

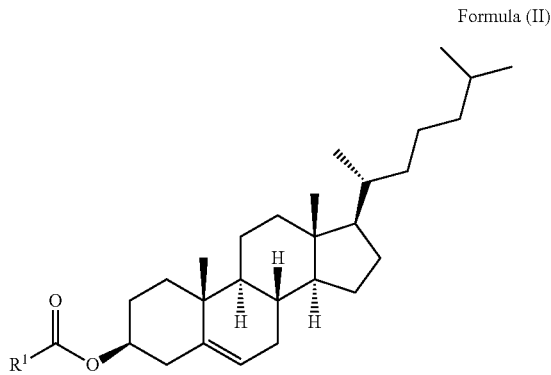

Formula (II)

where $R^1$ can be H, a halogen atom, or any straight, branched, or cyclic, substituted or unsubstituted, saturated or unsaturated alkyl, aryl, or aralkyl groups having a carbon number of from 1 to 30, and may include heteroatoms. As used herein, the term "alkyl" shall denote a monovalent group formed by removing a hydrogen atom from a hydrocarbon, and may include heteroatoms. As used herein, the term "aryl" shall denote a group derived from an arene by removal of a hydrocarbon atom from a ring carbon atom, and may include heteroatoms. As used herein, the term "aralkyl" shall denote a monovalent radical derived from an alkyl radical by replacing one or more hydrogen atoms by aryl groups. In one or more embodiments, $R^1$ can be a $C_1$ to $C_{30}$ alkyl or aryl group. Additionally, $R^1$ can be an unsaturated, unsubstituted, straight-chain $C_1$ to $C_{30}$ alkyl group. In still other embodiments, $R^1$ can be a straight, branched, or cyclic, substituted or unsubstituted, saturated or unsaturated $C_1$ to $C_{12}$ or $C_1$ to $C_5$ alkyl or aryl group. Specific examples of such cholesterol esters include, but are not limited to, cholesteryl formate, cholesteryl acetate, cholesteryl propionate, cholesteryl butyrate, cholesteryl arachidonate, cholesteryl behenate, cholesteryl benzoate, cholesteryl caprylate, cholesteryl dodecanoate, cholesteryl elaidate, cholesteryl erucate, cholesteryl heptanoate, cholesteryl hexanoate, cholesteryl laurate, cholesteryl linoleate, cholesteryl linolelaidate, cholesteryl n-decanoate, cholesteryl n-valerate, cholesteryl nervonate, cholesteryl oleate, cholesteryl palmitate, cholesteryl palmitelaidate, cholesteryl pelargonate, cholesteryl phenylacetate, cholesteryl stearate, and cholesteryl chloroformate. In one or more embodiments, the modifier employed in preparing the rubber composition can comprise an ester derivative of cholesterol selected from the group consisting of cholesteryl acetate, cholesteryl chloroformate, cholesteryl caprylate, and mixtures thereof.

Halogenated derivatives of cholesterol suitable for use as a modifier in preparing the rubber composition in various embodiments can have the following formula:

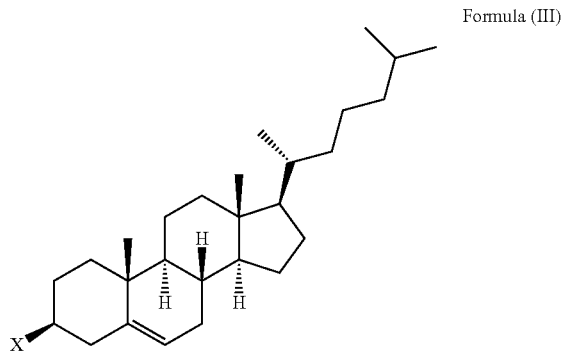

Formula (III)

where X is a halogen atom. Specific examples of halogenated cholesterol derivatives include, but are not limited to, cholesteryl bromide, cholesteryl chloride, and cholesteryl iodide.

When a steroid is employed for modification of the rubber composition, the steroid can be present in any desired concentration. In one or more embodiments, the steroid can be present in an amount of at least 5, at least 10, at least 20, at least 30, at least 40, at least 50, at least 60, at least 70, at least 80, at least 90, or at least 100 weight percent based on the weight of the above-mentioned elastomer component of the rubber composition. In other embodiments, the steroid can be present in an amount in the range of from about 5 to about 200, in the range of from about 10 to about 180, in the range of from about 20 to about 160, in the range of from about 30 to about 140, in the range of from about 40 to about 120, in the range of from about 50 to about 100, or in the range of from 60 to 80 weight percent based on the weight of the elastomer component of the rubber composition.

As described in greater detail below, the rubber composition can contain various elastomer components along with one or more modifiers and additional optional additives. The degree of interaction or reaction between the various ingredients or components of the rubber composition is not known with any great degree of certainty. Therefore, the rubber compositions described herein are intended to encompass a simple mixture of the ingredients, a complex of the various ingredients that is caused by physical or chemical forces of attraction, a chemical reaction product of the ingredients, or any combination thereof. Thus, in one or more embodiments, the addition of a steroid can result in a rubber composition being a pure mixture of the steroid, the elastomer component, and other optional components. In other embodiments, the addition of a steroid can result in a rubber composition comprising some, but not necessarily all, of a reaction product between the steroid, the elastomer components, and/or one or more other optional components. In still other embodiments, at least a portion of the steroid may actually become part of the elastomer polymer chains, such as by, for example, a grafting reaction.

In one or more embodiments, the rubber compositions can be modified by the addition of a peptide. As used herein, the term "peptide" shall denote a polymer formed of α-amino acids linked by peptide bonds and having an average chain length of 50 or fewer monomer residues. In on or more embodiments, the peptides suitable for use can have an average chain length in the range of from 5 to 50 or in the range of from 10 to 40 monomer residues. Any peptide known or hereafter discovered can be employed in the various embodiments described herein.

In one or more embodiments, the peptide employed can be one or more selected from the group consisting of milk peptides, ribosomal peptides, non-ribosomal peptides, peptones, derivatives thereof, and mixtures of two or more thereof. Additionally, the peptides employed herein can comprise any peptide containing one or more residues of amino acids selected from the group consisting of isoleucine, leucine, lysine, methionine, phenylalanine, threonine, tryptophan, valine, alanine, asparagine, aspartic acid, cysteine, glutamic acid, glutamine, glycine, proline, serine, tyrosine, arginine, histidine, derivatives thereof, and mixtures of two or more thereof.

When a peptide is employed for modification of the rubber composition, the peptide can be present in any desired concentration. In one or more embodiments, the peptide can be present in an amount of at least 5, at least 10, at least 20, at least 30, at least 40, at least 50, at least 60, at least 70, at least 80, at least 90, or at least 100 weight percent based on the weight of the above-mentioned elastomer component of the rubber composition. In other embodiments, the peptide can be present in an amount in the range of from about 0.1 to about 200, in the range of from about 1 to about 180, in the range of from about 10 to about 160, in the range of from about 20 to about 140, in the range of from about 30 to about 120, in the range of from about 30 to about 100, or in the range of from 30 to 80 weight percent based on the weight of the elastomer component of the rubber composition.

As noted above, the degree of interaction or reaction between the various ingredients or components of the rubber composition is not known with any great degree of certainty. Therefore, the rubber compositions described herein are intended to encompass a simple mixture of the ingredients, a complex of the various ingredients that is caused by physical or chemical forces of attraction, a chemical reaction product of the ingredients, or any combination thereof. Thus, in one or more embodiments, the addition of a peptide can result in a rubber composition being a pure mixture of the peptide, the elastomer component, and other optional components. In other embodiments, the addition of a peptide can result in a rubber composition comprising some, but not necessarily all, of a reaction product between the peptide, the elastomer components, and/or one or more other optional components. In still other embodiments, at least a portion of the peptide may actually become part of the elastomer polymer chains, such as by, for example, a grafting reaction.

As mentioned above, in various embodiments the rubber composition can comprise an elastomer component. Any elastomer known or hereafter discovered can be employed in one or more embodiments described herein. Examples of elastomers suitable for use in various embodiments include, but are not limited to, natural rubber (i.e., natural polyisoprene), synthetic polyisoprene, styrene-butadiene rubber, styrene-isoprene rubber, styrene-isoprene-butadiene rubber, butadiene-isoprene rubber, butyl rubber, halogenated butyl rubber, polybutadiene, nitrile rubber, hydrogenated nitrile rubber, chloroprene rubber, polyurethane, acrylonitrile-butadiene rubber, silicone rubber, fluoroelastomers, ethylene acrylic rubber, ethylene-propylene rubber, ethylene-propylene terpolymer, ethylene vinyl acetate copolymer, epichlorohydrin rubber, chlorinated polyethylene-propylene rubbers, chlorosulfonated polyethylene rubber, tetrafluoroethylene-propylene rubber, and ethylene propylene diene rubber. Additionally, the elastomer can be a thermoplastic elastomer, such as styrenic block copolymers, polyolefin blends, elastomeric alloys, thermoplastic polyurethanes, thermoplastic copolyester, and thermoplastic polyamides. Specific examples of such thermoplastic elastomers include, but are not limited to, poly(styrene-ethylene-propylene-styrene) ("SEPS"), polyer(styrene-ethylene-butylene-styrene) ("SEBS"), EEBS, EEPE, polypropylene, polyethylene, and polystyrene. In one or more embodiments, the elastomer component can comprise styrene-butadiene rubber.

The elastomer component can be present in the rubber composition in any desired concentration. In one or more embodiments, the elastomer can be present in an amount of at least 10, at least 20, at least 30, or at least 40 weight percent based on the weight of the entire rubber composition. In other embodiments, the elastomer can be present in an amount in the range of from about 10 to about 80, in the range of from about 20 to about 70, in the range of from about 30 to about 60, or in the range of from 40 to 50 weight percent based on the weight of the entire rubber composition.

As noted above, the rubber compositions described in the various embodiments herein can comprise one or more optional components. Such components include, but are not limited to, silica fillers, carbon blacks, extending agents, stearic acid, zinc oxides, antioxidants, silane coupling agents, sulfur, retarding agents, and/or accelerating agents.

When a carbon black component is employed in the rubber compositions described herein, it can be present in amounts ranging from about 1 to about 100 parts per hundred of the elastomer component ("pphe"). The carbon black can include any commonly available, commercially-produced carbon black. In one or more embodiments, carbon blacks having a surface area of at least 20 $m^2/g$ or in the range of from 35 $m^2/g$ to 200 $m^2/g$ can be used in various embodiments in the present invention. Among useful carbon blacks are furnace blacks, channel blacks, and lamp blacks. A mixture of two or more of the above blacks can be used in preparing the carbon black products employed in various embodiments of the present invention. Examples of suitable carbon blacks useful in various embodiments of the present invention include, but are not limited to, N-110, N-220, N-339, N-330, N-352, N-550, and N-660, as designated by ASTM D1765-82a.

As mentioned above, a silica filler can be employed in the rubber compositions described herein. Examples of silica fillers which can be used in various embodiments of the present invention include wet silica (hydrated silicic acid), dry silica (anhydrous silicic acid), calcium silicate, and the like. Such silica fillers are commercially available. Other suitable fillers include aluminum silicate, magnesium silicate, and the like. In one embodiment, precipitated amorphous wet-process, hydrated silicas can be employed. Silica can be employed in an amount in the range of about 1 to about 100 pphe, in the range of from about 5 to about 90 pphe, or in the range of from 30 to 80 pphe. Examples of commercially available silica fillers that can be used in various embodiments of the present invention include, but are not limited to, HI-SIL 190, HI-SIL 210, HI-SIL 215, HI-SIL 233, and HI-SIL 243 produced by PPG Industries of Pittsburgh, Pa., U.S.A. A number of useful commercial grades of different silicas are also available from DeGussa Corporation (e.g., VN2, VN3), Rhone Poulenc (e.g., ZEOSIL 1165 MP0), and J. M. Huber Corporation.

As mentioned above, one or more extending agents can be employed in the rubber compositions described herein. Suitable extending agents include, but are not limited to, extender oils and low molecular weight compounds or components. Such extender oils include those well known in the art such as, for example, naphthenic, aromatic, and paraffinic petroleum oils and silicone oils.

Examples of low molecular weight organic compounds or components useful as extenders in various embodiments of the present invention are low molecular weight organic materials having a number-average molecular weight of less than 20,000, less than 10,000, or less than 5,000. Such compounds or components are commercially available. Although there is no limitation on the material which may be employed, the following is a non-exhaustive list of examples of appropriate materials that can be used as extending agents in the present invention:

(1) Softening agents, such as aromatic naphthenic and parraffinic softening agents for rubbers or resins;
(2) Plasticizers, such as plasticizers composed of esters including phthalic, mixed pthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;
(3) Tackifiers, such as coumarone resins, coumaronein-dene resins, terpene phenol resins, petroleum hydrocarbons and rosin derivatives;
(4) Oligomers, such as crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrene-butadiene rubber, butadiene-acrylonitrile rubber, polychloroprene, etc.), silicone oligomers, and poly-α-olefins;
(5) Lubricants, such as hydrocarbon lubricants (e.g., paraffin and wax), fatty acid lubricants (e.g., higher fatty acid and hydroxy-fatty acid), fatty acid amide lubricants (e.g., fatty acid amide and alkylene-bisfatty acid amide), ester lubricants (e.g., fatty acid-lower alcohol ester, fatty acid-polyhydric alcohol ester and fatty acid-polyglycol ester), alcoholic lubricants (e.g., fatty alcohol, polyhydric alcohol, polyglycol and polyglycerol), metallic soaps, and mixed lubricants; and, (6) Petroleum hydrocarbons, such as synthetic terpene resins, aromatic hydrocarbon resins, aliphatic hydrocarbon resins, aliphatic or alicyclic petroleum resins, polymers of unsaturated hydrocarbons, and hydrogenated hydrocarbon resins.

Other appropriate low-molecular weight organic materials suitable for use as an extender include latexes, emulsions, liquid crystals, bituminous compositions, and phosphazenes. Additionally, two or more of the above-described materials may be used in combination as extending agents in various embodiments of the present invention.

When an extending agent is employed in the above-described compositions, the extending agent can be present in an amount of at least 0.5 pphe, in the range of from about 1 to about 80, in the range of from about 3 to about 50, or in the range of from 5 to 30 pphe.

As mentioned above, stearic acid can optionally be employed as a component in the rubber composition in various embodiments of the present invention. In one or more embodiments, stearic acid can be present in the rubber composition in an amount of at least 0.1, at least 0.5, or at least 1 pphe. In other embodiments, stearic acid can be present in the rubber composition in an amount in the range of from about 0.1 to about 5, in the range of from about 0.5 to about 4, or in the range of from 1 to 3 pphe.

As mentioned above, zinc oxide can optionally be employed as a component in the rubber composition in various embodiments of the present invention. In one or more embodiments, zinc oxide can be present in the rubber composition in an amount of at least 0.1, at least 0.5, or at least 1 pphe. In other embodiments, zinc oxide can be present in the rubber composition in an amount in the range of from about 0.1 to about 6, in the range of from about 0.5 to about 5, or in the range of from 1 to 4 pphe.

As mentioned above, one or more antioxidants can optionally be employed as a component in the rubber composition in various embodiments of the present invention. Suitable antioxidants can include commercially available antioxidants, such as, for example, Santoflex 13. In one or more embodiments, antioxidants can be present in the rubber composition in a cumulative amount of at least 0.01, at least 0.05, or at least 0.1 pphe. In other embodiments, antioxidants can be present in the rubber composition in a cumulative amount in the range of from about 0.01 to about 4, in the range of from about 0.05 to about 3, or in the range of from 0.1 to 2 pphe.

As mentioned above, one or more coupling agents can optionally be employed as a component in the rubber composition in various embodiments of the present invention. In one or more embodiments, a silane coupling agent can be employed. Examples of such coupling agents include, but are not limited to, bis-(3-triethoxysilylpropyl)tetrasulfide ("Si69"), bis-(3-triethoxysilylpropyl)disulfide ("Si75"), and alkyl alkoxysilanes, such as octyltriethoxy silane, and hexyltrimethoxy silane. In one or more embodiments, coupling agents can be present in the rubber composition in a cumulative amount of at least 1, at least 2, or at least 4 pphe. In other embodiments, coupling agents can be present in the rubber composition in a cumulative amount in the range of from about 1 to about 20, in the range of from about 2 to about 16, or in the range of from 4 to 12 pphe.

As mentioned above, sulfur can optionally be employed as a component in the rubber composition in various embodiments of the present invention. In one or more embodiments, sulfur can be present in the rubber composition in an amount of at least 0.1, at least 0.5, or at least 1 pphe. In other embodiments, sulfur can be present in the rubber composition in an amount in the range of from about 0.1 to about 5, in the range of from about 0.5 to about 4, or in the range of from 1 to 3 pphe.

As mentioned above, one or more retarding agents can optionally be employed as a component in the rubber composition in various embodiments of the present invention. An example of such a retarding agent includes, but is not limited to, N-(cyclohexylthio)phthalimide. In one or more embodiments, retarding agents can be present in the rubber composition in a cumulative amount of at least 0.01, at least 0.05, or at least 0.1 pphe. In other embodiments, retarding agents can be present in the rubber composition in a cumulative amount in the range of from about 0.01 to about 2, in the range of from about 0.05 to about 1, or in the range of from 0.1 to 0.5 pphe.

As mentioned above, one or more accelerating agents can optionally be employed as a component in the rubber composition in various embodiments of the present invention. Examples of such accelerating agents include, but are not limited to, cyclohexyl-benzothiazole sulfenamide and diphenylguanidine. In one or more embodiments, accelerating agents can be present in the rubber composition in a cumulative amount of at least 0.1, at least 0.5, or at least 1 pphe. In other embodiments, accelerating agents can be present in the rubber composition in a cumulative amount in the range of from about 0.1 to about 5, in the range of from about 0.5 to about 4, or in the range of from 1 to 3 pphe.

Certain additional fillers can also be utilized in the rubber compositions in various embodiments of the present invention, including mineral fillers, such as clay, talc, aluminum hydrate, aluminum hydroxide, and mica. The foregoing additional fillers are optional and can be utilized in an amount in the range of from about 0.5 to about 40 pphe.

Still other optional additives that can be employed in the rubber compositions described herein include those known in the art of rubber compounding, such as activators, additional processing additives, pigments, additional fillers, fatty acids, anti-ozonants, and peptizing agents. As known to those skilled in the art, depending on the intended use of the rubber compositions, the additives mentioned above can be selected and used in conventional amounts.

The above-described rubber compositions can have a variety of improved properties. In one or more embodiments, the rubber compositions can have a ring-tensile strength at 23° C. (M50) of at least 1.3, at least 1.4, or at least 1.5 under the conditions provided for in ASTM D412 using a ring-shaped sample having a width of 0.05 inches and a thickness of 0.075 inches. Additionally, in various embodiments, the rubber composition can exhibit a Lambourn index (i.e., abrasion resistance) of at least 105, at least 110, at least 115, at least 120, at least 125, at least 130, at least 135, at least 140, at least 145, or at least 150 at 65% slip ratio. The Lambourn index of the inventive rubber compositions are determined by comparing them to a rubber sample having an identical composition except not being modified by either a steroid or a peptide and containing an equivalent amount by weight of an aromatic oil in place of the absent modifier, where the unmodified composition has a comparative Lambourn index of 100. Additionally, Lambourn index is determined according to ASTM D2228. Furthermore, in various embodiments, the rubber composition can have a wet traction of at least 62, at least 63, at least 64, or at least 65 as measured on a British Portable Skid Tester with a sample size of 2.54×7.62×0.64 cm.

The rubber compositions described above can be prepared by any methods known or hereafter discovered in the art. In one or more embodiments, the rubber compositions can be compounded by known conventional methods. However, without wishing to be bound by theory, it appears that the inventors have discovered a method of composition preparation that yields unexpectedly improved results. Thus, in one or more embodiments, the rubber compositions described above can be prepared by the following method.

Initially, the elastomer component can be compounded with the above-described silica filler in an initial mixing stage to thereby form an initial mixture. Additionally, the initial mixture can optionally include the above-described extenders (e.g., aromatic oils and waxes), stearic acid, antioxidants, and/or coupling agents. These components can be combined in their respective above-described amounts. In one or more embodiments, this initial mixture can be mixed for a time period of at least 1, at least 2, or at least 3 minutes. Additionally, this initial mixture can be mixed for a time period in the range of from about 1 to about 60 minutes, in the range of from about 2 to about 30 minutes, or in the range of from 3 to 10 minutes. The initial mixing stage can additionally be performed at an initial temperature of at least 50, at least 75, or at least 100° C. Furthermore, the initial mixing stage can be performed at an initial temperature in the range of from about 50 to about 300° C., in the range of from about 75 to about 200° C., or in the range of from 100 to 120° C. Furthermore, this initial mixing stage can be performed in a commercial mixer, such as, for example, a Brabender mixer. The mixing speed employed for the initial mixing stage can be at least 20 rpm, at least 35 rpm, or at least 50 rpm. Additionally, the mixing speed employed for the initial mixing stage can be in the range of from about 20 to about 100 rpm, in the range of from about 35 to about 85 rpm, or in the range of from 50 to 70 rpm.

After the desired mixing period, the initial mixing stage can optionally be terminated for a termination period of at least 5, at least 10, or at least 20 seconds. In other embodiments, the termination period can be in the range of from about 5 seconds to about one hour, in the range of from about 10 seconds to about 30 minutes, or in the range of from 20 seconds to 10 minutes.

Following the initial mixing stage and optional termination period, the resulting initial mixture can be combined with a steroid and/or a peptide as described herein. The resulting intermediate composition can undergo a second mixing stage (a.k.a., a "remill" stage). In one or more embodiments, this intermediate mixture can be mixed for a time period of at least 1, at least 2, or at least 3 minutes. Additionally, this intermediate mixture can be mixed for a time period in the range of from about 1 to about 60 minutes, in the range of from about 2 to about 30 minutes, or in the range of from 3 to 10 minutes. The remill stage can additionally be performed at an initial temperature of at least 50, at least 75, or at least 100° C. Furthermore, the remill stage can be performed at an initial temperature in the range of from about 50 to about 300° C., in the range of from about 75 to about 200° C., or in the range of from 100 to 120° C. Furthermore, the remill stage can be performed in a commercial mixer, such as, for example, a Brabender mixer. The mixer employed for the remill stage can be the same or different as the one employed during the initial mixing stage, described above. In one or more embodiments, the mixer employed for the remill stage is the same as that employed for the initial mixing stage. The mixing speed employed during the remill stage can be at least 20 rpm, at least 35 rpm, or at least 50 rpm. Additionally, the mixing speed employed during the remill stage can be in the range of from about 20 to about 100 rpm, in the range of from about 35 to about 85 rpm, or in the range of from 50 to 70 rpm.

After the desired mixing period, the remill mixing stage can optionally be terminated for a second termination period of at least 5, at least 10, or at least 20 seconds. In other embodiments, the second termination period can be in the range of from about 5 seconds to about one hour, in the range of from about 10 seconds to about 30 minutes, or in the range of from 20 seconds to 10 minutes.

Following the remill stage and optional second termination period, any one or more of the remaining above-described optional components can be added to the resulting intermediate mixture. For instance, one or more of sulfur components, retarding agents, zinc oxide, or accelerating agents can be combined with the intermediate mixture in any of the above-described respective quantities. In one or more embodiments, this final mixture can be mixed for a time period of at least 20, at least 30, or at least 40 seconds. Additionally, this final mixture can be mixed for a time period in the range of from about 20 to about 70 seconds, in the range of from about 30 to about 60 seconds, or in the range of from 40 to 50 seconds. The final mixing stage can additionally be performed at an initial temperature of at least 35, at least 50, or at least 65° C. Furthermore, the final mixing stage can be performed at an initial temperature in the range of from about 35 to about 115° C., in the range of from about 50 to about 100° C., or in the range of from 65 to 85° C. Furthermore, the final mixing stage can be performed in a commercial mixer, such as, for example, a Brabender mixer. The mixer employed for the final mixing stage can be the same or different as the one employed during the initial mixing stage and/or remill stage, described above. In one or more embodiments, the mixer employed for the final mixing stage is the same as that employed for the initial mixing stage and the remill stage. The mixing speed employed during the final mixing stage can be at least 20 rpm, at least 35 rpm, or at least 50 rpm. Additionally, the mixing speed employed during the final mixing stage can be in the range of from about 20 to about 100 rpm, in the range of from about 35 to about 85 rpm, or in the range of from 50 to 70 rpm.

Following preparation, the above-described rubber compositions can be employed in making a variety of articles of manufacture. An example of an article of manufacture suitable for the rubber compositions to be employed in includes, but is not limited to, the manufacture of tires. In one or more embodiments, the rubber compositions described herein can constitute at least a portion of a tire, such as a pneumatic tire employed for a variety of uses (e.g., an automobile pneumatic tire). In various embodiments, a tire can comprise the rubber composition in an amount of at least 0.1 weight percent, at least 1 weight percent, at least 10 weight percent, at least 20 weight percent, or at least 40 weight percent based on the entire weight of the tire. Additionally, the tire can comprise the rubber composition in an amount in the range of from about 1 to about 80 weight percent, in the range of from about 2 to about 60 weight percent, or in the range of from 5 to about 40 weight percent based on the entire weight of the tire. In one or more embodiments, tires according to various embodiments of the present invention can comprise a tread member. In such embodiments, the tread member of a tire can comprise the rubber compositions described herein in an amount of at least 50, at least 60, at least 70, at least 80, at least 90, at least 95, or at least 99 weight percent, based on the entire weight of the tread member. The term "tread" is a well known term in the art and is used herein in accordance with its usual and customary meaning.

Tires employing the rubber compositions described herein can be prepared by any known or hereafter discovered methods in the art. In one or more embodiments, the tire can be prepared following the general steps of (a) preparing a rubber composition, such as a rubber composition as described above; (b) introducing at least a portion of the rubber composition into a tire mold; and (c) subjecting the rubber composition in the tire mold to curing conditions to thereby form the tire. Step (a) of this procedure can be performed using any or all of the methods and/or components as described above. In step (b) of this procedure, the rubber composition can constitute a portion of a green tire that can additionally comprise other components. The term "green tire" is a known term in the art meaning an uncured tire and is used herein in accordance with its usual and customary meaning. For instance, the rubber composition can constitute a part or all of any one or more of the components of a green tire, such as, for instance, the inner lining, the sidewalls, the body plies, the belt package, and/or the tread. Following formation of the green tire, the rubber composition can be placed (as part of the green tire) into a tire mold for curing. Curing conditions for curing a tire are known to those skilled in the art. Any curing conditions suitable in tire manufacturing can be employed during step (c) above. For example, curing conditions can include treatment by increased temperature and/or pressure. In one or more embodiments, curing conditions can include elevating the temperature of the green tire to a temperature in the range of from about 200 to about 500° F., or in the range of from 300 to 400° F. Additionally, curing conditions can include subjecting the green tire to pressures in the range of from about 200 to about 500 pounds per square inch ("psi"), or in the range of from 300 to 400 psi. Furthermore, the green tire can be subjected to curing conditions for any suitable amount of time. In one or more embodiments, the green tire can be subjected to curing conditions for a time period in the range of from about 1 minute to about 5 hours, in the range of from about 5 minutes to about 1 hour, or in the range of from 10 to 20 minutes. Following formation, the cured tire can be removed from the mold and subjected to various finishing processes known in the art.

This invention can be further illustrated by the following examples of embodiments thereof, although it will be understood that these examples are included merely for purposes of illustration and are not intended to limit the scope of the invention unless otherwise specifically indicated.

EXAMPLES

Reagents

In the following examples, cholesterol and cholesterol derivatives were employed in formulating various rubber compositions. The cholesterol employed was a 95 percent pure 3β-hydroxy-5-cholestene obtained from Sigma-Aldrich Corp., St. Louis, Mo., USA (product no. C75209). The cholesteryl acetate employed in the following examples was a 95 percent pure 3β-acetoxy-5-cholestene obtained from Sigma-Aldrich Corp., St. Louis, Mo., USA (product no. 151114). The cholesteryl chloroformate used was 97 percent pure and was obtained from Sigma-Aldrich Corp., St. Louis, Mo., USA (product no. C77007). Additionally, the cholesteryl caprylate employed in the following examples had a 90 percent purity and was obtained from Sigma-Aldrich Corp., St. Louis, Mo., USA (product no. 125253).

Example 1

Preparation of Control Rubber Sample

A rubber composition control sample (sample ID 1) was prepared having the following composition, shown in Table 1:

TABLE 1

Composition of Control Rubber Sample

| Component | Parts by Weight |
|---|---|
| Styrene-Butadiene Rubber[A] | 100.00 |
| Precipitated Silica Filler[B] | 70.00 |
| Aromatic Oil[C] | 30.00 |
| Wax[D] | 1.50 |
| Stearic Acid[E] | 2.00 |
| Santoflex 13[F] (antioxidant) | 0.95 |
| Si69[G] (silane coupling agent) | 8.00 |
| Sulfur[H] | 1.70 |
| N-(cyclohexylthio)phthalimide[I] (retarder) | 0.25 |
| Zinc Oxide[J] | 2.50 |
| Cyclohexyl-benzothiazole sulfenamide[K] (accelerator) | 1.50 |
| Diphenylguanidine[L] (accelerator) | 0.50 |

[A]23.5% styrene, solution polymerized, Mooney viscosity at 100° C. = 55, 11% vinyl content; available from Firestone Synthetic (Akron, OH, USA).
[B]Purchased from PPG (Pittsburgh, PA, USA) as hydrate amorphous silica.
[C]Purchased from Mobil (Fairfax, VA, USA) under the trade name Mobilsol 90.
[D]Purshaced from Aston Wax Corp. (Tilusville, PA, USA).
[E]Purchased from Sherex Chemical (Dublin, OH, USA).
[F]Chemical name: N-(1,3-dimethylbutyl-N'-phenyl-P-phenylene-diamine; purchased from Monsanto (St. Louis, MO, USA) under the trade name 6PPD.
[G]Chemical name: bis-(3-triethoxy-silyl propyl) tetrasulfide; purchased from Degussa (Parsippany, NJ, USA).
[H]Purchased from International Sulphur (Mt. Pleasant, TX, USA).
[I]Purchased from Monsanto (St. Louis, MO, USA) under the trade name Santogard PVI.
[J]Purchased from Zinc Corp. America (Monaca, PA, USA).
[K]Purchased from Monsanto (St. Louis, MO, USA).
[L]Purchased from Monsanto (St. Louis, MO, USA).

The control rubber sample was prepared by initially charging the styrene-butadiene rubber to a 300 g Brabender mixer, set at an agitation speed of 60 rpm and an initial temperature of 110° C. Thereafter, the oil, silica filler, silane coupling agent, Santoflex 13, stearic acid, and wax were charged to the mixer over a period of about 0.5 minutes. The resulting mixture was then mixed under the above conditions for a period of about 4.5 minutes. Following a drop period whereby mixing was temporarily discontinued, the mixture was then remilled at a temperature of 110° C. for a period of about 5.0 minutes at the same speed and in the same mixer as the initial mixing phase. Thereafter, at a temperature of 75° C., the sulfur, N-(cyclohexylthio)phthalimide, cyclohexyl-benzothiazole sulfonamide, zinc oxide, and diphenylguanidine described in Table 1 were charged to the mixer after a period of about 0.5 minutes and then mixed for a period of about 45 seconds. The resulting stock was sheeted and molded at 165° C. for 15 minutes.

Example 2

Preparation of Modified Rubber Samples 2-6

Four rubber compositions (sample IDs 2-5) were prepared according to the formulation shown in Table 1 by selectively replacing a portion of the aromatic oil in the compound formulation with cholesterol (ID 2), cholesteryl acetate (ID 3), cholesteryl chloroformate (ID 4), and cholesteryl caprylate (ID 5). An additional rubber composition (sample ID 6) was prepared by simply adding cholesterol in addition to the compound formulation described above in Table 1 (i.e., not replacing a portion of the aromatic oil). Each sample was prepared in the same manner as described above in Example 1, with the cholesterol or cholesterol derivative being charged to the mixer at the beginning of the initial mixing stage. The resulting rubber samples had the following compositions shown in Table 2, below. The components listed in Table 2 were the same as those described above with respect to Table 1 in Example 1.

TABLE 2

Composition of Rubber Samples 2-6

| Component* | ID 2 | ID 3 | ID 4 | ID 5 | ID 6 |
|---|---|---|---|---|---|
| Styrene-Butadiene Rubber | 100.00 | 100.00 | 100.00 | 100.00 | 100.00 |
| Precipitated Silica Filler | 70.00 | 70.00 | 70.00 | 70.00 | 70.00 |
| Aromatic Oil | 15.00 | 15.00 | 15.00 | 15.00 | 30.00 |
| Cholesterol | 15.00 | — | — | — | 15.00 |
| Cholesteryl Acetate | — | 15.00 | — | — | — |
| Cholesteryl Chloroformate | — | — | 15.00 | — | — |
| Cholesteryl Caprylate | — | — | — | 15.00 | — |
| Wax | 1.50 | 1.50 | 1.50 | 1.50 | 1.50 |
| Stearic Acid | 2.00 | 2.00 | 2.00 | 2.00 | 2.00 |
| Santoflex 13 (antioxidant) | 0.95 | 0.95 | 0.95 | 0.95 | 0.95 |
| Si69 (silane coupling agent) | 8.00 | 8.00 | 8.00 | 8.00 | 8.00 |
| Sulfur | 1.70 | 1.70 | 1.70 | 1.70 | 1.70 |
| N-(cyclohexylthio)-phthalimide | 0.25 | 0.25 | 0.25 | 0.25 | 0.25 |
| Zinc Oxide | 2.50 | 2.50 | 2.50 | 2.50 | 2.50 |
| Cyclohexyl-benzothiazole sulfenamide | 1.50 | 1.50 | 1.50 | 1.50 | 1.50 |
| Diphenylguanidine | 0.50 | 0.50 | 0.50 | 0.50 | 0.50 |

*Component concentrations given in parts by weight

Example 3

Analysis of Rubber Samples 1-6

Each of sample IDs 1-6 was tested for rheological properties, Mooney viscosity, dynamic properties, tensile strength, hardness, wet traction, and abrasion resistance. The Mooney viscosity of each sample was determined at 130° C. The rheological properties of each sample were determined at 165° C. employing an MDR2000 rheometer (Alpha Technologies, Akron, Ohio, USA). The shore A hardness of each sample was determined at 23° C. and 100° C.

Tensile strength of the samples was determined according to procedures provided in ASTM D412. The test specimen geometry used for tensile strength determinations was a ring having a width of 0.05 inches and a thickness of 0.075 inches. The specimen was tested at a specific gauge length of 1.0 inch.

The dynamic properties for each of the samples were evaluated using an Oscillatory Shear Dynamic Analyzer (ARIS, manufactured by TA Instruments, New Castle, Del., USA). The test specimen geometry was in the form of a strip having a length of 30 mm, a width of 15 mm, and a thickness of 1.8 mm. The following testing conditions were employed: frequency 5 Hz, 2% strain.

Measurement of the wet traction (Stanley London) was performed on the British Portable Skid Tester (see *Road Research Laboratory Technical Paper No.* 66, by C. G. Giles, et al., London (1966)). The sample geometry for the wet traction test was a rectangular bar of 2.54×7.62×0.64 cm Measurement of abrasion resistance was determined according to ASTM D2228. The index values reported for samples 2-6, below, were determined on the basis that the wear resistance of control sample 1 was 100.

The results of the above-described determinations are provided in Table 3, below:

TABLE 3

Characteristics and Performance Results of Rubber Samples 1-6

| | | Sample ID: | | | | | |
|---|---|---|---|---|---|---|---|
| | | 1 | 2 | 3 | 4 | 5 | 6 |
| MDR 2000 (165° C.) | ML (dNm): | 2.62 | 1.90 | 2.75 | 3.19 | 2.81 | 1.29 |
| | MH (dNm): | 19.55 | 19.74 | 20.22 | 17.08 | 19.13 | 14.03 |
| | t90 (min): | 16.30 | 14.74 | 16.46 | 30.92 | 18.79 | 16.71 |
| Mooney Viscosity (130° C.) | $ML_{1+4}$ (MU): | 51.5 | 42.3 | 51.4 | 61.8 | 53.7 | 30.0 |
| DYNASTAT (0° C.) | K' (lb f/in.): | 515.9 | 1498.7 | 515.2 | 458.9 | 1199.5 | 963.3 |
| | K" (lb f/in.): | 116.4 | 342.2 | 125.6 | 109.3 | 259.1 | 273.3 |
| | tan δ: | 0.226 | 0.228 | 0.244 | 0.238 | 0.216 | 0.284 |
| DYNASTAT (23° C.) | K' (lb f/in.): | 341.9 | 683.0 | 363.3 | 307.0 | 649.3 | 391.1 |
| | K" (lb f/in.): | 68.3 | 191.3 | 72.7 | 69.5 | 156.6 | 121.5 |
| | tan δ: | 0.200 | 0.280 | 0.200 | 0.227 | 0.241 | 0.311 |
| DYNASTAT (50° C.) | K' (lb f/in.): | 254.0 | 296.4 | 272.0 | 209.4 | 254.1 | 167.3 |
| | K" (lb f/in.): | 43.7 | 63.8 | 44.9 | 41.0 | 51.1 | 36.2 |
| | tan δ: | 0.172 | 0.215 | 0.165 | 0.196 | 0.201 | 0.216 |
| R-Tensile (23° C.) | M50: | 1.26 | 1.59 | 1.28 | 1.37 | 1.57 | 1.13 |
| | M300: | 7.33 | 7.64 | 7.19 | 7.34 | 7.46 | 5.11 |
| | Tb(MPa): | 19.54 | 21.05 | 19.98 | 15.93 | 17.37 | 16.45 |
| | Eb(%): | 587.64 | 626.23 | 609.89 | 524.8 | 558.79 | 688.74 |
| Hardness (100° C.) | Shore A Mean: | 56.28 | 58.78 | 57.54 | 54.96 | 55.06 | 50.88 |
| Hardness (23° C.) | Shore A Mean: | 60.82 | 67.82 | 61.58 | 60.32 | 65.92 | 59.72 |
| Strain Sweep (25° C.) 5%, 5 Hz [0.25-14%], 5 Hz | G' (MPa): | 3.801 | 6.018 | 3.925 | 3.582 | 6.608 | 4.515 |
| | G" (MPa): | 0.796 | 1.829 | 0.860 | 0.776 | 1.649 | 1.354 |
| | tan δ: | 0.209 | 0.304 | 0.219 | 0.217 | 0.249 | 0.300 |
| | Δ G' (MPa): | 4.296 | 10.314 | 4.609 | 2.672 | 9.867 | 7.313 |
| Wet Traction | Stanley London: | 59.8 | 62.8 | 59.8 | 63.8 | 59.0 | 63.8 |

TABLE 3-continued

Characteristics and Performance Results of Rubber Samples 1-6

| | | Sample ID: | | | | | |
|---|---|---|---|---|---|---|---|
| | | 1 | 2 | 3 | 4 | 5 | 6 |
| Lambourn (abrasion resistance) | 25% Slip: | 0.0311 | 0.03415 | 0.0209 | 0.265 | 0.02745 | 0.02265 |
| | Index: | 100 | 91 | 149 | 117 | 113 | 137 |
| | 65% Slip: | 0.043167 | 0.041967 | 0.031133 | 0.034633 | 0.033733 | 0.034733 |
| | Index: | 100 | 103 | 139 | 125 | 128 | 124 |

As can be seen in Table 3, the most noticeable improvements are that the rubber samples modified with cholesterol or cholesterol derivatives generally show better wear (i.e., abrasion resistance) and wet traction when compared to the control sample. The results shown in Table 3 also offer some indication that tensile strength is improved in the modified rubber samples.

Example 4

Preparation of Control Rubber Sample 7 and Modified Rubber Samples 8-12

Another set of six samples (one control, sample ID 7, and five modified samples, sample IDs 8-12) was prepared according to the same procedure described above, with one exception. In the modified samples of this example, the cholesterol or cholesterol derivative was added to the rubber composition at the beginning of the remill stage of sample preparation, as described above, instead of at the beginning of the initial mixing stage. The resulting samples had the following compositions shown in Table 4, below. The components listed in Table 4 were the same as those described above with respect to Table 1 in Example 1.

TABLE 4

Composition of Rubber Samples 7-12

| Component* | ID 7 (control) | ID 8 | ID 9 | ID 10 | ID 11 | ID 12 |
|---|---|---|---|---|---|---|
| Styrene-Butadiene Rubber | 100.00 | 100.0 | 100.0 | 100.0 | 100.0 | 100.0 |
| Precipitated Silica Filler | 70.00 | 70.00 | 70.00 | 70.00 | 70.00 | 70.00 |
| Aromatic Oil | 30.00 | 15.00 | 15.00 | 15.00 | 15.00 | 30.00 |
| Cholesterol | — | 15.00 | — | — | — | 15.00 |
| Cholesteryl Acetate | — | — | 15.00 | — | — | — |
| Cholesteryl Chloroformate | — | — | — | 15.00 | — | — |
| Cholesteryl Caprylate | — | — | — | — | 15.00 | — |
| Wax | 1.50 | 1.50 | 1.50 | 1.50 | 1.50 | 1.50 |
| Stearic Acid | 2.00 | 2.00 | 2.00 | 2.00 | 2.00 | 2.00 |
| Santoflex 13 (antioxidant) | 0.95 | 0.95 | 0.95 | 0.95 | 0.95 | 0.95 |
| Si69 (silane coupling agent) | 8.00 | 8.00 | 8.00 | 8.00 | 8.00 | 8.00 |
| Sulfur | 1.70 | 1.70 | 1.70 | 1.70 | 1.70 | 1.70 |
| N-(cyclohexylthio)phthalimide | 0.25 | 0.25 | 0.25 | 0.25 | 0.25 | 0.25 |
| Zinc Oxide | 2.50 | 2.50 | 2.50 | 2.50 | 2.50 | 2.50 |
| Cyclohexyl-benzothiazole sulfenamide | 1.50 | 1.50 | 1.50 | 1.50 | 1.50 | 1.50 |
| Diphenylguanidine | 0.50 | 0.50 | 0.50 | 0.50 | 0.50 | 0.50 |

*Component concentrations given in parts by weight

Example 5

Analysis of Rubber Samples 7-12

Each of sample IDs 7-12 was tested for rheological properties, Mooney viscosity, dynamic properties, tensile strength, hardness, wet traction, and abrasion resistance. The procedures followed for these determinations were the same as those described above in Example 3. The results of these determinations are provided in Table 5, below:

TABLE 5

Characteristics and Performance Results of Samples 7-12

| | | Sample ID: | | | | | |
|---|---|---|---|---|---|---|---|
| | | 7 | 8 | 9 | 10 | 11 | 12 |
| MDR 2000 (165° C.) | ML (kg · cm): | 2.78 | 1.83 | 2.58 | 2.28 | 2.57 | 1.35 |
| | MH (kg · cm): | 19.66 | 18.54 | 21.21 | 15.72 | 20.11 | 13.77 |

TABLE 5-continued

Characteristics and Performance Results of Samples 7-12

| | | Sample ID: | | | | | |
|---|---|---|---|---|---|---|---|
| | | 7 | 8 | 9 | 10 | 11 | 12 |
| | MH-ML (kg · cm): | 16.88 | 16.71 | 18.63 | 13.44 | 17.54 | 12.42 |
| | t90 (min): | 16.51 | 14.15 | 15.31 | 31.39 | 16.72 | 15.33 |
| Mooney Viscosity (130° C.) | $ML_{1+4}$ (MU): | 53.7 | 44.5 | 52.3 | 60.4 | 53.5 | 32.7 |
| DYNASTAT (−20° C.) | K' (lb f/in.): | 736.6 | 2044.7 | 971.6 | 542.4 | 1612.7 | 1269.2 |
| | K" (lb f/in.): | 240.0 | 498.4 | 318.9 | 186.3 | 446.1 | 424.1 |
| | tan δ: | 0.326 | 0.244 | 0.329 | 0.344 | 0.277 | 0.335 |
| DYNASTAT (0° C.) | K' (lb f/in.): | 522.7 | 1286.2 | 582.1 | 332.3 | 1007.7 | 744.1 |
| | K" (lb f/in.): | 121.0 | 309.2 | 146.7 | 75.0 | 240.1 | 224.0 |
| | tan δ: | 0.231 | 0.240 | 0.252 | 0.226 | 0.238 | 0.301 |
| DYNASTAT (23° C.) | K' (lb f/in.): | 352.9 | 616.9 | 410.9 | 236.1 | 679.6 | 338.0 |
| | K" (lb f/in.): | 71.3 | 174.0 | 84.6 | 48.9 | 160.9 | 103.2 |
| | tan δ: | 0.202 | 0.282 | 0.206 | 0.207 | 0.237 | 0.305 |
| DYNASTAT (50° C.) | K' (lb f/in.): | 259.2 | 292.9 | 301.8 | 176.4 | 281.0 | 163.0 |
| | K" (lb f/in.): | 45.2 | 67.5 | 50.2 | 30.0 | 56.4 | 36.1 |
| | tan δ: | 0.174 | 0.231 | 0.166 | 0.170 | 0.201 | 0.221 |
| Ring Tear (170° C.) | Strength (N/mm): | 15.0 | 16.3 | 16.0 | 12.3 | 16.1 | 15.7 |
| | Travel (%) | 286.7 | 372.9 | 295.0 | 210.3 | 304.3 | 456.4 |
| R-Tensile (100° C.) | M50: | 0.98 | 0.86 | 0.97 | 0.89 | 0.92 | 0.66 |
| | M300: | 5.64 | 5.13 | 5.66 | 5.79 | 5.50 | 3.65 |
| | Tb(MPa): | 7.62 | 7.66 | 8.27 | 6.63 | 7.44 | 7.33 |
| | Eb(%): | 381.2 | 402.7 | 399.5 | 334.3 | 383.1 | 493.2 |
| R-Tensile (23° C.) | M50: | 1.23 | 1.30 | 1.26 | 1.22 | 1.44 | 0.99 |
| | M300: | 6.82 | 6.55 | 7.13 | 7.62 | 7.21 | 4.73 |
| | Tb(MPa): | 18.23 | 18.68 | 20.40 | 17.46 | 18.60 | 16.25 |
| | Eb(%): | 595.8 | 621.3 | 614.1 | 524.8 | 591.5 | 698.2 |
| Hardness (100° C.) | Shore A Mean: | 56.4 | 55.1 | 58.7 | 51.9 | 55.6 | 48.2 |
| Hardness (23° C.) | Shore A Mean: | 55.9 | 65.1 | 61.2 | 56.6 | 65.6 | 58.7 |
| Strain Sweep (25° C.) 5%, 5 Hz [0.25-14%], 5 Hz | G' (MPa): | 4.46 | 5.96 | 4.60 | 2.94 | 6.61 | 3.97 |
| | G" (MPa): | 0.91 | 1.75 | 1.00 | 0.58 | 1.67 | 1.19 |
| | tan δ: | 0.204 | 0.294 | 0.218 | 0.197 | 0.252 | 0.301 |
| | Δ G' (MPa): | 4.77 | 10.28 | 5.63 | 1.73 | 10.20 | 6.29 |
| Wet Traction | Stanley London: | 61.8 | 66.8 | 65.8 | 66.2 | 62.8 | 69.0 |
| Lambourn (abrasion resistance) | 25% Slip ratio: | 0.01635 | 0.0158 | 0.0090 | 0.0152 | 0.0096 | 0.0068 |
| | Index: | 100 | 103 | 182 | 108 | 170 | 240 |
| | 65% Slip ratio: | 0.02545 | 0.02195 | 0.01365 | 0.01785 | 0.01825 | 0.02485 |
| | Index: | 100 | 116 | 186 | 143 | 139 | 102 |

As can be seen in the results listed in Table 5, again the most noticeable improvements are that the rubber samples modified with cholesterol or cholesterol derivatives generally show better wear (i.e., abrasion resistance) and wet traction when compared to the control sample. The results in Table 5 also give some indication to improved tensile strength. Additionally, when compared to the results listed in Table 3, above, it seems that adding the cholesterol or cholesterol derivative during the remill stage of preparation improves the performance of the resulting modified rubber composition.

SELECTED DEFINITIONS

It should be understood that the following is not intended to be an exclusive list of defined terms. Other definitions may be provided in the foregoing description accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

What is claimed is:

1. A tire comprising a rubber composition comprising:
   an elastomer component and a modifier comprising a steroid, wherein said tire comprises said rubber composition in an amount of at least 0.1 weight percent based on the entire weight of said tire.

2. The tire of claim 1, wherein said steroid is selected from the group consisting of cholestanes, cholanes, pregnanes, androstanes, estranes, derivatives thereof, and mixtures of two or more thereof.

3. The tire of claim 1, wherein said steroid comprises cholesterol, a derivative of cholesterol, or mixtures thereof.

4. The tire of claim 1, wherein said steroid comprises an ester derivative of cholesterol selected from the group consisting of cholesteryl formate, cholesteryl acetate, cholesteryl propionate, cholesteryl butyrate, cholesteryl benzoate, cholesteryl laurate, cholesteryl caprylate, cholesteryl chloroformate, and mixtures of two or more thereof.

5. The tire of claim 1, wherein said steroid comprises a halogenated derivative of cholesterol selected from the group consisting of cholesteryl bromide, cholesteryl chloride, cholesteryl iodide, and mixtures of two or more thereof.

6. The tire of claim 1, wherein said steroid comprises cholesterol.

7. The tire of claim 1, wherein said rubber composition comprises said modifier in an amount of at least 5 weight percent based on the weight of said elastomer component in said rubber composition.

8. The tire of claim 1, wherein said elastomer component is selected from the group consisting of natural rubber, synthetic polyisoprene, styrene-butadiene rubber, butyl rubber, halogenated butyl rubber, polybutadiene, nitrile rubber, hydrogenated nitrile rubber, chloroprene rubber, polyurethane, ethylene propylene diene rubber, derivatives thereof, and mixtures of two or more thereof.

9. The tire of claim 1, wherein said elastomer component comprises styrene-butadiene rubber.

10. The tire of claim 1, wherein said rubber composition comprises said elastomer component in an amount of at least 10 weight percent based on the entire weight of said rubber composition.

11. The tire of claim 1, wherein said tire comprises said rubber composition in an amount of at least 10 weight percent based on the entire weight of said tire.

12. The tire of claim 1, wherein said rubber composition further comprises one or more additives selected from the group consisting of silica fillers, carbon blacks, aromatic oils, waxes, stearic acid, antioxidants, silane coupling agents, sulfur, zinc oxide, retarding agents, and accelerating agents.

13. The tire of claim 1, wherein said tire comprises a tread member, wherein at least a portion of said rubber composition is located in said tread member.

14. The tire of claim 13, wherein said tread member comprises said rubber composition in an amount of at least 50 weight percent based on the weight of said tread member.

15. The tire of claim 1, wherein said rubber composition has a ring-tensile strength at 23° C. (M50) of at least 1.3 under the conditions provided for in ASTM D412 using a ring-shaped sample having a width of 0.05 inches and a thickness of 0.075 inches, wherein said rubber composition exhibits a Lambourn index value of at least 105 at a 65% slip ratio as compared to an un-modified rubber sample otherwise having the same composition but having an equivalent amount of aromatic oil in place of the absent modifier and providing a relative standard Lambourn index value of 100, wherein said rubber composition has a wet traction of at least 62 as measured on a British Portable Skid Tester with a sample size of 2.54×7.62×0.64 cm.

16. A method of making a tire, said method comprising: (a) preparing a rubber composition comprising an elastomer component and a modifier comprising a steroid; (b) introducing at least a portion of said rubber composition into a tire mold; and (c) subjecting said rubber composition in said tire mold to one or more curing conditions to thereby form said tire.

17. The method of claim 16, wherein said preparing of step (a) comprises the steps of: (i) subjecting said elastomer component and a silica filler to an initial mixing stage to thereby form an initial mixture; (ii.) combining and mixing said steroid with said initial mixture following said initial mixing stage to thereby form an intermediate mixture; and (iii) combining and mixing one or more curing additives with said intermediate mixture to thereby form said rubber composition.

18. The method of claim 17, wherein step (i) further comprises combining one or more additional components with said elastomer component and said silica filler, wherein said additional components are selected from the group consisting of aromatic oils, waxes, stearic acid, antioxidants, coupling agents, and mixtures of two or more thereof.

19. The method of claim 17, wherein said curing additives of step (iii) are selected from the group consisting of sulfur, zinc oxide, retarding agents, accelerating agents, and mixtures of two or more thereof.

20. The method of claim 16, wherein said rubber composition is introduced into said tire mold in step (b) as at least a portion of a green tire.

21. The method of claim 20, wherein said green tire comprises one or more components selected from the group consisting of a tread member, an inner lining, sidewalls, body plies, and/or a belt package.

22. The method of claim 21, wherein said green tire comprises said tread member, wherein said tread member comprises at least a portion of said rubber composition.

23. The method of claim 16, wherein said steroid comprises cholesterol, a derivative of cholesterol, or mixtures thereof.

24. The method of claim 16, wherein said elastomer component is selected from the group consisting of natural rubber, synthetic polyisoprene, styrene-butadiene rubber, butyl rubber, halogenated butyl rubber, polybutadiene, nitrile rubber, hydrogenated nitrile rubber, chloroprene rubber, polyurethane, ethylene propylene diene rubber, derivatives thereof, and mixtures of two or more thereof.

25. The method of claim 16, wherein said rubber composition further comprises one or more additives selected from the group consisting of silica fillers, carbon black, aromatic oils, waxes, stearic acid, antioxidants, silane coupling agents, sulfur, zinc oxide, retarding agents, and accelerating agents.

26. The method of claim 16, wherein said rubber composition has a ring-tensile strength at 23° C. (M50) of at least 1.3 under the conditions provided for in ASTM-D 412 using a ring-shaped sample having a width of 0.05 inches and a thickness of 0.075 inches, wherein said rubber composition exhibits a Lambourn index value of at least 105 at a 65% slip ratio as compared to an un-modified rubber sample otherwise having the same composition but having an equivalent amount of aromatic oil in place of the absent modifier and providing a relative standard Lambourn index value of 100, wherein said rubber composition has a wet traction of at least 62 as measured on a British Portable Skid Tester with a sample size of 2.54×7.62×0.64 cm.

* * * * *